(12) United States Patent
Yakata et al.

(10) Patent No.: US 6,648,404 B2
(45) Date of Patent: Nov. 18, 2003

(54) VEHICLE BODY SIDE STRUCTURE

(75) Inventors: Takashi Yakata, Toyoake (JP); Hideki Honjo, Okazaki (JP)

(73) Assignees: Mitsubishi Jidosha Kogyo Kabushiki Kaisha (JP); Mitsubishi Jidosha Engineering Kabushiki Kaisha (JP)

( * ) Notice: Subject to any disclaimer, the term of this patent is extended or adjusted under 35 U.S.C. 154(b) by 0 days.

(21) Appl. No.: 10/280,618

(22) Filed: Oct. 25, 2002

(65) Prior Publication Data
US 2003/0102697 A1 Jun. 5, 2003

(30) Foreign Application Priority Data
Oct. 25, 2001 (JP) ........................................ 2001-327737

(51) Int. Cl.$^7$ ................................................. B60J 7/00
(52) U.S. Cl. .................................. 296/209; 296/203.03
(58) Field of Search .............................. 296/209, 188, 296/203.03, 204, 189, 30, 194, 203.01, 205, 146.6, 185, 203.04

(56) References Cited

U.S. PATENT DOCUMENTS

| | | | | |
|---|---|---|---|---|
| 3,528,699 A | * | 9/1970 | Wessells ..................... | 296/209 |
| 4,252,364 A | * | 2/1981 | Toyama et al. .............. | 296/185 |
| 4,944,553 A | * | 7/1990 | Medley et al. ............... | 296/209 |
| 5,246,264 A | * | 9/1993 | Yoshii ......................... | 296/209 |
| 5,443,297 A | * | 8/1995 | Tanaka et al. ............... | 296/209 |
| 5,671,968 A | * | 9/1997 | Masuda et al. .............. | 296/209 |
| 5,785,378 A | * | 7/1998 | Seefried et al. ........ | 296/203.03 |
| 5,860,694 A | * | 1/1999 | Seefried et al. ........ | 296/203.03 |
| 5,938,275 A | * | 8/1999 | Kleinhans et al. .......... | 296/209 |
| 5,941,597 A | * | 8/1999 | Horiuchi et al. ....... | 296/203.03 |
| 6,073,992 A | * | 6/2000 | Yamauchi et al. .......... | 296/209 |
| 6,129,410 A | * | 10/2000 | Kosaraju et al. ........ | 296/203.03 |
| 6,217,109 B1 | * | 4/2001 | Okana et al. .......... | 296/203.03 |
| 6,279,990 B1 | * | 8/2001 | Miyasaka et al. ........... | 296/209 |
| 6,315,353 B1 | * | 11/2001 | Brodt et al. ................. | 296/209 |
| 6,322,135 B1 | * | 11/2001 | Okana et al. ............... | 296/209 |
| 6,386,625 B1 | * | 5/2002 | Dukat et al. ................. | 296/209 |
| 6,409,257 B1 | * | 6/2002 | Takashina et al. .......... | 296/209 |
| 6,467,834 B1 | * | 10/2002 | Barz et al. ................... | 296/188 |
| 2002/0190544 A1 | * | 12/2002 | Yamamoto et al. ..... | 296/203.03 |

FOREIGN PATENT DOCUMENTS

| | | | |
|---|---|---|---|
| JP | 2 299989 | * | 12/1990 |
| JP | 5 39063 | * | 2/1993 |
| JP | 5 139340 | * | 6/1993 |
| JP | 5 208688 | * | 8/1993 |
| JP | 8 301143 | * | 11/1996 |
| JP | 2001 71948 | * | 3/2001 |

* cited by examiner

Primary Examiner—Kiran Patel
(74) Attorney, Agent, or Firm—Rossi & Associates

(57) ABSTRACT

There is provided a vehicle body side structure that is capable of effectively reinforcing door hinge mounting parts of a pillar. In a vehicle skeleton member forming a closed section by an outer side structure and an inner side structure, a side sill reinforcement is disposed inside the closed section. The side sill reinforcement is provided to extend from a front pillar up to a side sill. The door hinge mounting parts are provided on an external surface of the front pillar. The side sill reinforcement is constructed such that a part disposed along the front pillar has a greater plate thickness than a part extending along the side sill. A support part intended for supporting the reverse side of the door hinge mounting part from the inner side of the outer side structure is provided in the part of the side sill reinforcement, which is disposed along the front pillar.

13 Claims, 5 Drawing Sheets

VEHICLE BODY SIDE STRUCTURE

CROSS REFERENCE TO RELATED APPLICATION

This non-provisional application and incorporates by reference the subject matter of Application No. 2001-4460 filed in Japan on Oct. 25, 2001, on which a priority claim is based under 35 U.S.C. §119(a).

BACKGROUND OF THE INVENTION

1. Field of the Invention

The present invention relates to a vehicle body side structure that is applied to a joint where a lower part of a pillar and a side sill are joined to each other in a vehicle.

2. Description of the Related Art

In a conventional vehicle, a variety of reinforcements, bulkheads, and the like are disposed at a joint where the lower part of a front pillar and the front part of a side sill are joined to each other. In particular, since a door hinge mounting part is required to withstand a heavy load, the door hinge mounting part is configured to have a high stiffness in the vicinity of the joint where the lower part of the front pillar and the front part of the side sill are joined to each other. Therefore, at the joint where the lower part of the front pillar and the front part of the side sill are joined to each other, a thick hinge reinforcement configured separately from a side sill reinforcement is provided at the reverse side of the door hinge mounting parts.

For the reasons stated above, a number of parts are required in the vicinity of the joint where the lower part of the front pillar and the front part of the side sill are joined to each other, and this requires a large number of man hours for assembly.

SUMMARY OF THE INVENTION

In view of the above, it would therefore be desirable to provide a vehicle body side structure that is capable of reinforcing door hinge mounting parts of a pillar and simplifying the arrangement of a joint where the lower part of the pillar and a side sill are joined to each other.

To attain the above object, the present invention provides a vehicle body side structure in which a side sill reinforcement is disposed inside a closed section formed by an outer side structure and an inner side structure. The side sill reinforcement is provided to extend from a front pillar to a side sill, and is constructed at least such that a front part disposed along the front pillar has a different plate thickness than a part extending along the side sill and that a support part intended for supporting a door hinge mounting parts from a vehicle inner side of the outer side structure is provided in the part disposed along the front pillar.

The above arrangement is capable of reducing the number of parts at a conventional reinforcing portion while keeping the stiffness around the door hinge mounting parts, since the side sill reinforcement is constructed such that the part disposed along the front pillar has a different plate thickness than the part extending along the side sill. Furthermore, a support part of the side sill reinforcement reinforces the door hinge mounting parts of the front pillar.

BRIEF DESCRIPTION OF DRAWINGS

The nature of this invention, as well as other objects and advantages thereof, will be explained in the following with reference to the accompanying drawings, in which like reference character designate the same or similar parts throughout the figures and wherein.

DETAILED DESCRIPTION OF PREFERRED EMBODIMENTS

The present invention will now be described in detail with reference to the accompanying drawing showing an embodiment thereof.

Figure 3:
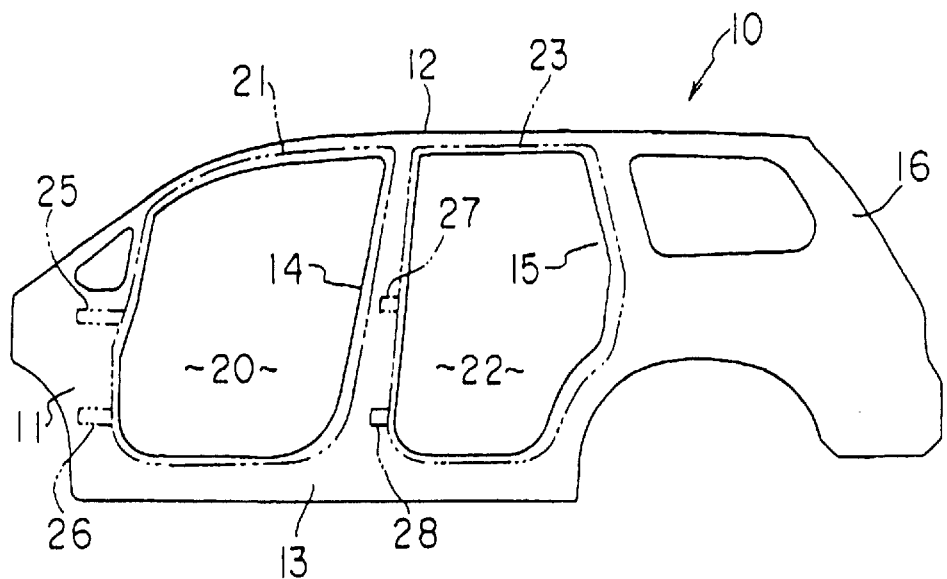
FIG. 3 is a side view showing a vehicle body having the vehicle skeleton member in FIG. 1.

A vehicle body 10 in FIG. 3 is comprised of a front pillar 11, a roof portion 12, a side sill 13, a center pillar 14, a rear pillar 15, a rear gate pillar 16, and so forth.

A front door 21 is mounted on an opening 20 formed between the front pillar and the center pillar 14. A rear door 23 is mounted on an opening 22 formed between the center pillar 14 and the rear pillar 15. The front door 21 is rotatably supported by a pair of upper and lower door hinge members 25, 26. Similarly, the rear door 23 is rotatably supported by a pair of upper and lower door hinge members 27, 28.

Figure 1:
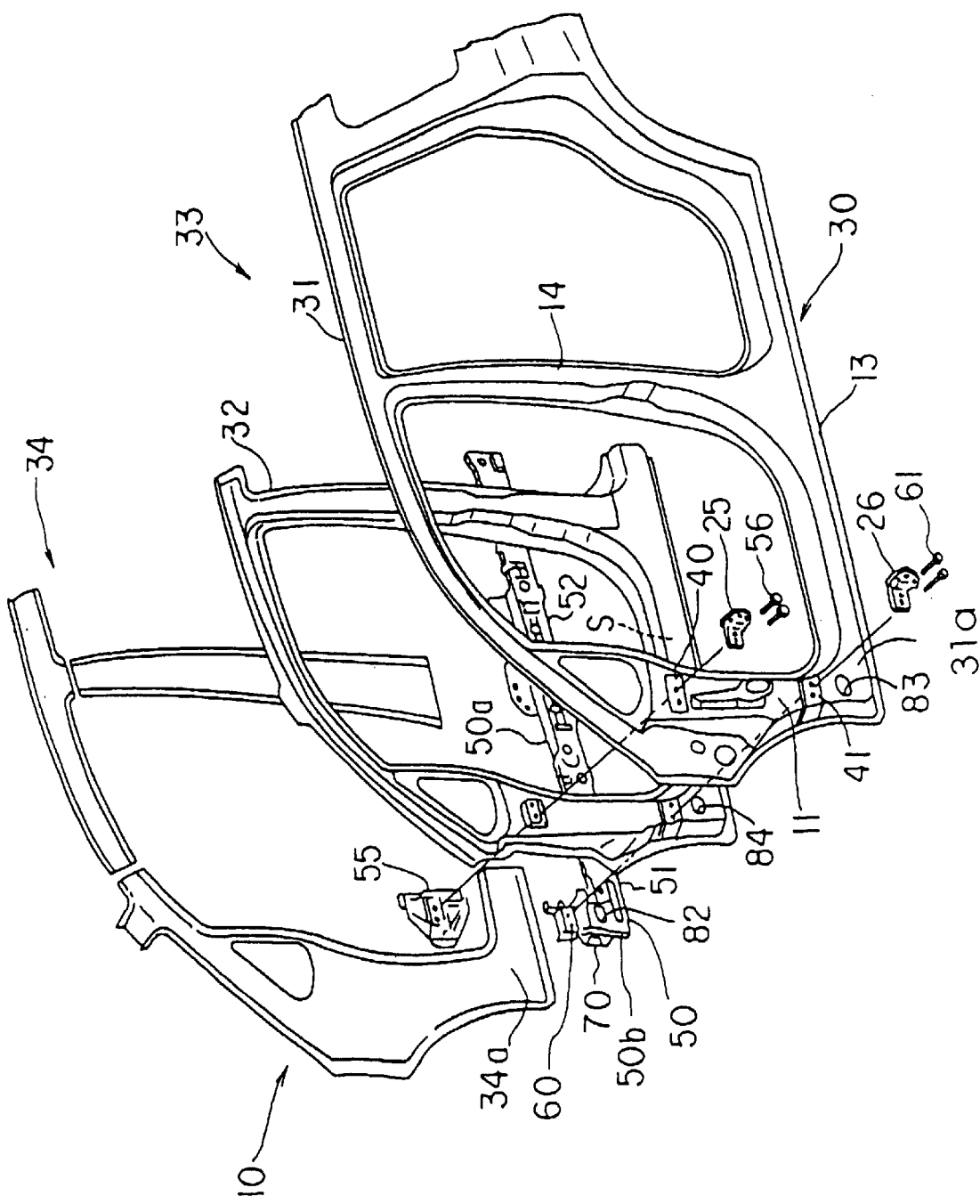
FIG. 1 is an exploded perspective view showing a vehicle skeleton member according to an embodiment of the present invention.

FIG. 1 illustrates a vehicle skeleton member 30 constituting the body 10. The vehicle skeleton member 30 includes an outer side structure 33 that is comprised of an outer panel 31 enclosing the door openings and a reinforcement 32 disposed at the vehicle inner side of the outer panel 31, and an inner side structure that is comprised of an inner panel 34 disposed at the vehicle inner side of the outer side structure 33. The reinforcement 32 is an annular reinforcement that is configured as an integral unit and encloses the door openings.

The outer side structure 33 includes a part 31a constituting a region from the front pillar 11 up to the side sill 13. Door hinge mounting parts 40, 41 used for mounting the door hinges 25, 26 are provided on an external surface of the front pillar 11 of the outer side structure 33.

The outer side structure 33 and the inner side structure 34 are joined to each other by welding or the like, and a closed section S is formed between the outer side structure 33 and the inner side structure 34. Specifically, the vehicle skeleton member 30 has a closed section that is formed by the outer side structure 33 and the inner panel 34 working in association with each other. The closed section S extends at least from the front pillar 11 up to the side sill 13.

A side sill reinforcement 50 is housed in the closed section S. The side sill reinforce 50 extends from the front pillar 11 to the side sill 13. The side sill reinforcement 50 includes a side sill area 50a that extends along the side sill 13 in the longitudinal direction of the vehicle, and a front end 50b lying in an upright position along the front pillar 11.

Figure 2:
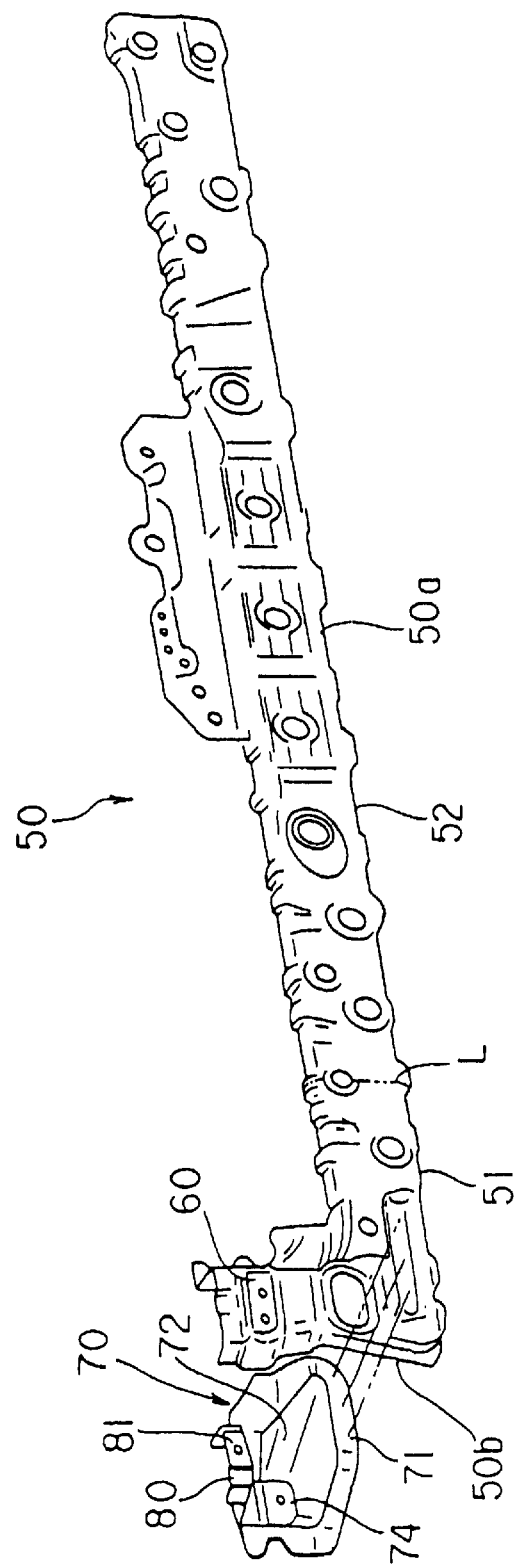
FIG. 2 is a perspective view showing a side sill reinforcement and a front reinforcement contained in the vehicle skeleton member in FIG. 2.

In further detail, the side sill reinforcement 50 is comprised of at least a first part 51 including the front end 50b disposed along the front pillar 11, and a second part 52 extending rearward along the side sill 13 from the first part 51. The boundary between the first part 51 and the second part 52 is indicated by a two-dot chain line L in FIGS. 2, 3. The plate thickness of the first part 51 is larger than that of the second part 52.

The first part 51 is formed of a plate having a thickness of 1.8 mm, for example. On the other hand, the second part 52 is formed of a thin plate with a thickness of 1.3 mm, for example. The first part 51 and the second part 52 are joined by welding. Specifically, the side sill reinforcement 50 is formed of a tailored blank material with the thickness varying in the longitudinal direction.

A hinge reinforcement 55 is mounted on the reverse side of the upper door hinge mounting part 40 supporting the front door 21. The hinge reinforcement 55 reinforces the upper door hinge mounting part 40 from the inner side of the outer side structure 33. The door hinge member 25 is fastened on the door hinge mounting part 40 by a bolt 56.

A support part 60 used for supporting the reverse side of the door hinge mounting part 41 is formed in the first part 51 having a greater plate thickness in the side sill reinforcement 50. The support part 60 reinforces the door hinge mounting part 41. The door hinge member 26 is fastened on the door hinge mounting part 41 by a bolt 61.

Figure 4:
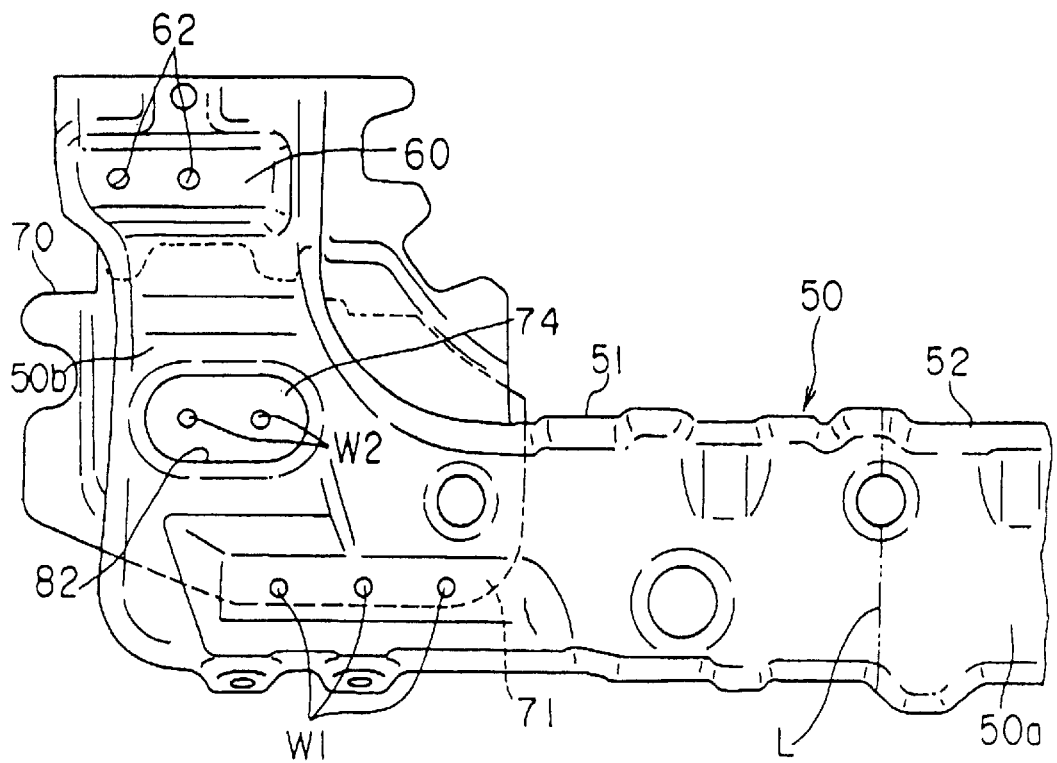
FIG. 4 is a side view showing the front part of the side sill reinforcement and the front reinforcement in FIG. 1.
Figure 5:
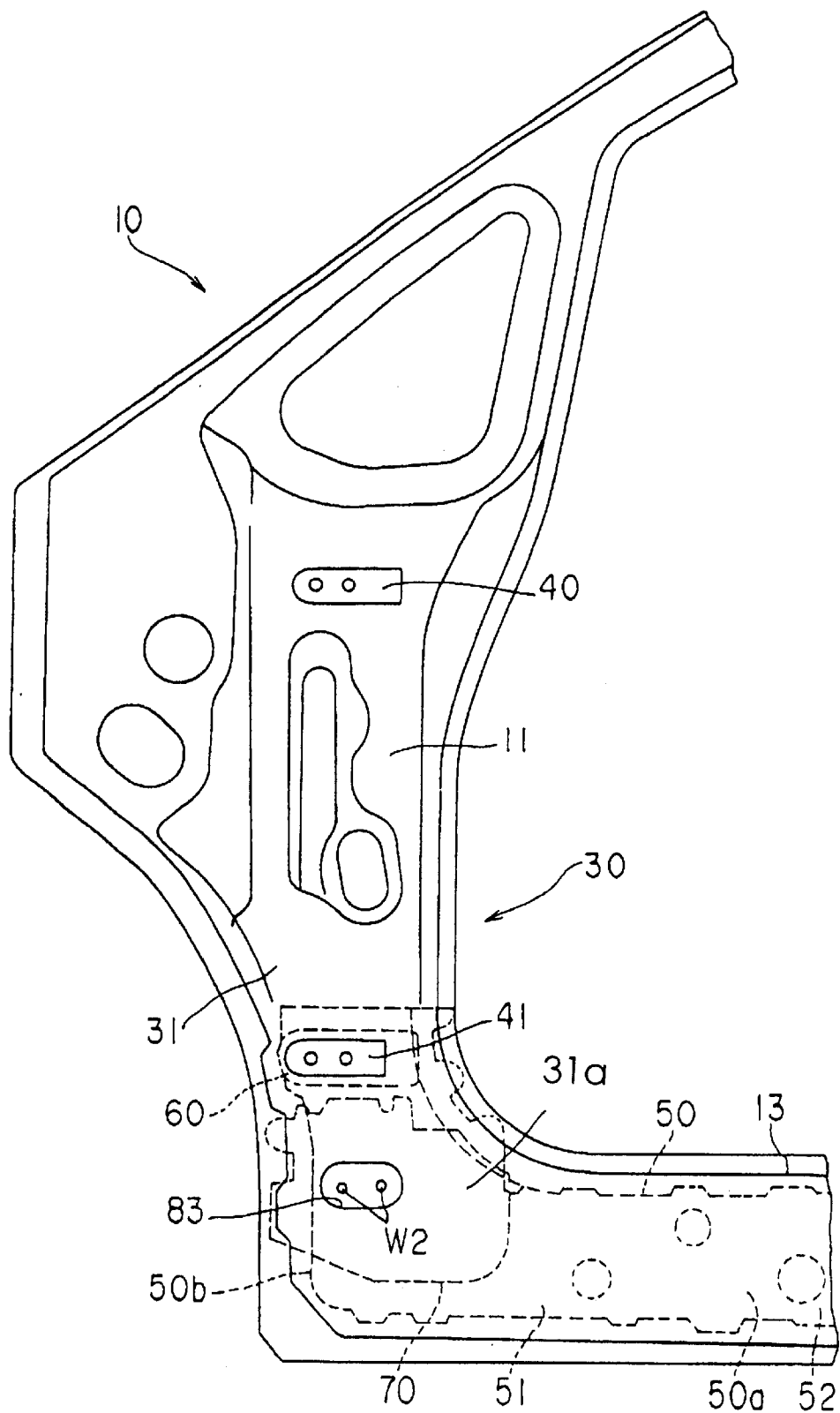
FIG. 5 is an enlarged side view showing a part of the vehicle skeleton member in FIG. 1.

To increase the stiffness of the door hinge mounting part 41, it is preferred that the support part 60 reinforcing the door hinge mounting part 41 is formed as convex and projecting toward the reinforcement 32 by pressing. As shown in FIG. 4, a nut member (refer to FIG. 6), with which is engaged the bolt 61 used-for mounting the door hinge member 26, is provided at the reverse side of a hole 62 formed in the support 60. The side sill reinforcement 50 is joined to the inside wall of the outer side structure 33 and the inner side structure 34 by welding or the like.

A front reinforcement 70 is provided at the vehicle inner side of the first part 51 as the front end of the side sill reinforcement 50. The front reinforcement 70 is disposed between the inner panel 34 and the side sill reinforcement 50, and is comprised of an opening edge 71 (illustrated in FIG. 2 and other figures) welded to the outer side structure 33 and a projection 72 (illustrated in FIG. 6 and other figures) projecting from the opening edge 71 to the vehicle inner side toward the inner panel 34.

Figure 6:
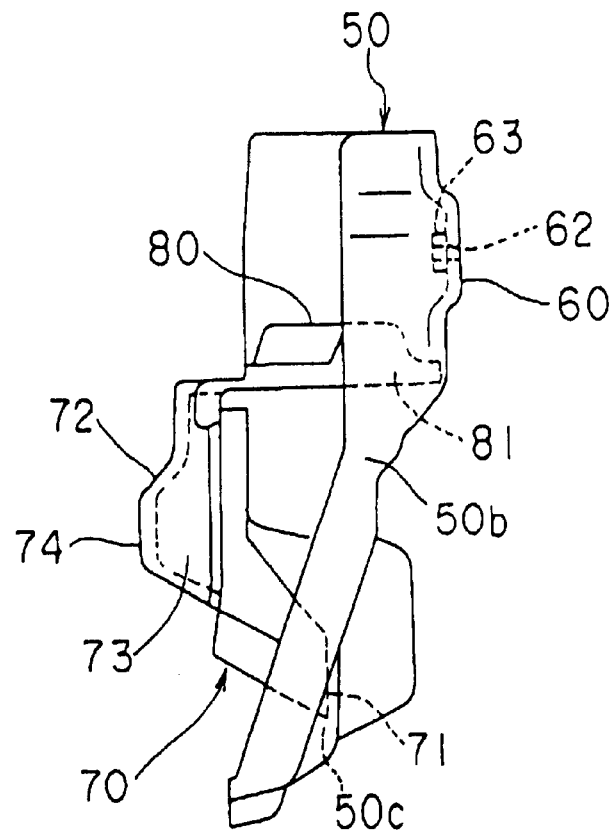
FIG. 6 is a front view showing the side sill reinforcement and the front reinforcement in FIG. 1.
Figure 7:
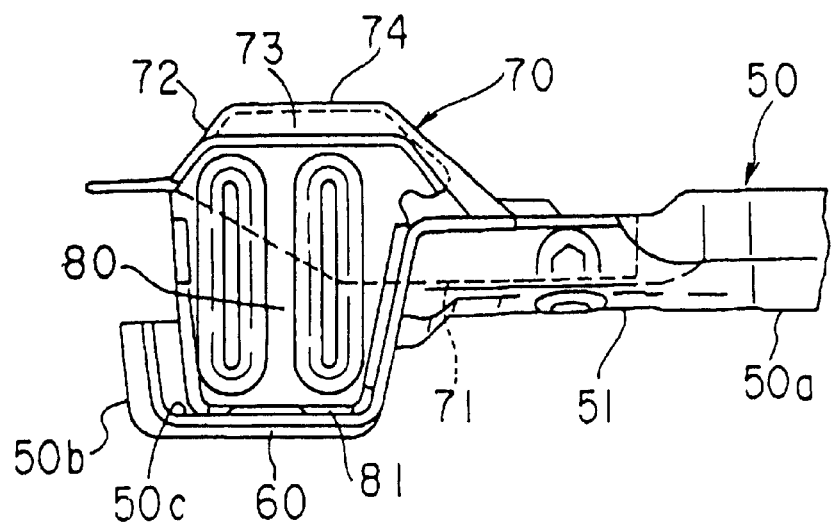
FIG. 7 is a plan view showing the side sill reinforcement and the front reinforcement in FIG. 1.

As shown in FIGS. 6 and 7, the projection 72 of the front reinforcement 70 has a peripheral wall 73, which has a sectional form like a cup and is integrated with the opening edge 71 by drawing pressing or the like, and a bottom wall 74 formed at an end of the peripheral wall 73. The peripheral wall 73 is tapered (substantially mortar-like or cup-like shaped) such that the width decreases away from the opening edge 71 toward the bottom wall 74. The peripheral wall 73 ranges to the opening edge 71 over the whole circumference of the bottom wall 74.

The opening edge 71 is joined to an inner wall 50c of the side sill reinforcement 50 by spot welding. In FIG. 4, W1 denotes an example of welding positions where the opening edge 71 is welded to the inner wall 50c. As shown in FIG. 6, a bracket member 80 is welded to the upper part of the front reinforcement 70. A flange 81 located at an end of the bracket member 80 is joined to the inner wall 50c of the side sill reinforcement 50 by welding or the like.

The bottom wall 74 of the front reinforcement 70 is joined to the inner panel 34 by spot welding at a location where the bottom wall 74 is in contact with an inner wall 34a of the inner panel 34. In FIG. 4, reference W2 denotes welding positions where the bottom wall 74 of the front reinforcement 70 is welded to the inner panel 34. Through-holes 82, 83, 84 as work holes, into which a welding gun can be inserted, are formed in the side sill reinforcement 50 and the outer side structure 33 correspondingly to the welding positions W2.

By inserting the welding gun from the through-holes 82, 83, 84 toward the bottom wall 74, the inner wall 34a of the inner panel 34 and the bottom wall 74 are welded to each other at the welding positions W2 by spot welding. Since the through-holes 82, 83, 84 are formed into which the welding gun can be inserted, the bottom wall 74 and the inner panel 34 are joined to each other by means of the welding gun which is the existing welding equipment.

According to the above described embodiment, the opening edge 71 of the front reinforcement 70 having the substantially mortar-shaped (or cup-shaped) projection 72 formed by drawing pressing is joined to the side sill reinforcement 50, and the bottom wall 74 is joined to the inner panel 34.

Therefore, the joint where the lower part of the front pillar 11 and the front part of the side sill 13 in the vehicle skeleton member 30 are joined to each other can be reinforced effectively by the first part 51 (having a greater plate thickness) of the side sill reinforcement 50, and the stiffness of the door hinge mounting part 41 to which a heavy load is applied can be improved.

Although it is preferred that the opening edge 71 of the front reinforcement 70 is joined to the side sill reinforcement 50 over the whole circumference thereof, this is not limitative, but a part of the opening edge 71 in the circumferential direction may be opened. Although it is preferred that the peripheral wall 73 of the projection 72 is joined to the opening edge 71 over the whole circumference of the bottom wall 74, this is not limitative, but as the cases may be, a part of the peripheral wall 73 in the circumferential direction may be opened.

Further, although in the above described embodiment, the bottom wall 74 is joined to the inner wall 34a of the inner side structure 34 and the opening edge 71 is joined to the side sill reinforcement 50, this is not limitative, but the bottom wall 74 may be jointed to the side sill reinforcement 50 and the opening edge 71 may be joined to the inner wall 34a of the inner side structure 34.

What is claimed is:

1. A vehicle body side structure comprising:
    an outer side structure including an external surface of a front pillar and an external surface of a side sill;
    door hinge mounting parts provided on said outer side structure; and
    a side sill reinforcement disposed on a vehicle inner side of said outer side structure to support said door hinge mounting parts from the vehicle inner side of said outer side structure, said side sill reinforcement being constructed such that a part disposed along the front pillar has a different plate thickness than a part extending along the side sill.

2. A body side structure according to claim 1, wherein the side sill reinforcement is constructed such that a part disposed along the front pillar has a greater plate thickness than a part extending along the side sill.

3. A body side structure according to claim 1, wherein the support part is formed to be convex and projecting toward said outer side structure by pressing.

4. A vehicle body side structure according to claim 3, wherein the skeleton member forms a closed section by said outer side structure and said inner side structure; and wherein said side sill reinforcement is disposed inside the closed section and includes a substantially mortar-shaped front reinforcement at a front end thereof.

5. A vehicle body side structure according to claim 4, wherein the front reinforcement is disposed in a vehicle inner side of said side sill reinforcement.

6. A vehicle body side structure according to claim 5, wherein a bottom wall of the mortar shaped front reinforcement is welded to said inner side structure.

7. A vehicle body side structure according to claim 6, wherein through-holes into which a welding gun is capable of being inserted are formed at positions where said side sill reinforcement and said outer side structure are welded to each other.

8. A vehicle body side structure according to claim 6, wherein an opening edge of the substantially mortar-shaped front reinforcement is joined to said side sill reinforcement.

9. A vehicle body side structure according to claim 7, wherein the opening edge of the front reinforcement is joined to said side sill reinforcement over whole circumference thereof.

10. A vehicle body side structure according to claim 5, wherein a bottom wall of the substantially mortar-shaped front reinforcement is welded to said side sill reinforcement.

11. A vehicle body side structure according to claim 6, wherein an opening edge of the substantially mortar-shaped front reinforcement is welded to said inner side structure.

12. A vehicle body structure according to claim 1, wherein said outer side structure comprises an outer panel enclosing a door opening, and an annular reinforcement configured as an integral unit and disposed at a vehicle inner side of the outer panel to enclose the door opening.

13. A vehicle body structure according to claim 1, wherein said side sill reinforcement is formed of a tailored blank material with the thickness varying in the longitudinal direction.

* * * * *